April 24, 1962      B. H. CLAMPITT ET AL      3,031,520
SOLAR TO ELECTRICAL ENERGY CONVERSION SYSTEM Filed Oct. 10, 1960      2 Sheets-Sheet 1

INVENTORS.
BERT H. CLAMPITT
DALE E. GERMAN
BY
*John H. Widdowson*
ATTORNEY

April 24, 1962     B. H. CLAMPITT ET AL     3,031,520

SOLAR TO ELECTRICAL ENERGY CONVERSION SYSTEM

Filed Oct. 10, 1960     2 Sheets-Sheet 2

*INVENTORS.*
BERT H. CLAMPITT
DALE E. GERMAN
BY
John H. Widdowson
ATTORNEY

United States Patent Office 3,031,520
Patented Apr. 24, 1962

3,031,520
SOLAR TO ELECTRICAL ENERGY CONVERSION SYSTEM
Bert H. Clampitt and Dale E. German, Wichita, Kans., assignors to Boeing Airplane Company, Wichita, Kans.
Filed Oct. 10, 1960, Ser. No. 61,452
15 Claims. (Cl. 136—89)

This invention relates to concentration cells, and in a more specific aspect, to method and means for converting solar energy to electrical energy. In a still more specific aspect, this invention relates to a method of providing electrical energy from solar energy through a photochemical and electrochemical process and to apparatus or means used in conversion of the energy from one form to the other.

Heretofore various types of concentration cells have been proposed. These include solar cells which use the photovoltaic effect to accomplish the desired energy conversion. These cells have two basic disadvantages, that is, they are relatively expensive to produce and they require a heavy external storage battery to store the electrical energy produced for subsequent use. These disadvantages present serious limitations on the commercial possibilities of these cells and the weight limitation makes such cells undersirable for use in satellites or space vehicles.

In accordance with the present invention, new methods and means are provided for converting solar energy to electrical energy through a photochemical process which are relatively inexpensive in comparison with prior art methods and devices. The present method and means also eliminates the need for external storage batteries to store the electrical energy produced for subsequent use when no irradiation is available. The present invention can be operated with various chemical compounds which undergo a photochemical reaction upon being irradiated. The method and means of the invention are such that the product of that reaction can be stored and allowed to recombine in an electrochemical manner when the desired energy conversion is required, thus acting as a storage cell as well as a reaction chamber.

The preferred fuel cell of the invention includes two chambers or sections which are separated by an ion bridge. Electrodes are provided in each of the cells or chambers and means are provided to shield one of the chambers while the other is being irradiated. The chemical compounds are placed in the chambers and one of the chambers is irradiated, causing a photochemical reaction and resulting in a potential difference between the chambers. If desired, the apparatus can be made reversible so that each of the two chambers are alternately irradiated and shielded to provide a continuous source of electrical energy.

The preferred method of the invention includes the steps of placing solutions of the chemical compounds suitable for the reactions described in chambers which are separated by ion bridge, and irradiating the solution in one of the chambers while shielding the solution in the other chamber. The irradiation produces a potential difference between the chambers due to the photochemical reaction which takes place in the irradiated chamber. Catalysts can be provided in the shielded chambers which promote the opposite chemical reaction occurring in the irradiated side so that the chamber first subjected to irradiation can be shielded and another photochemical reaction obtained by irradiating the previously shielded side to create additional electrical energy.

Accordingly it is an object of this invention to provide new method and means for obtaining electrical energy from irradiation, especially from solar irradiation.

Another object of the invention is to provide a new method of obtaining electrical energy from solar energy through a photochemical reaction.

A further object of the invention is to provide a new method of obtaining electrical energy from solar energy through photochemical and electrochemical steps.

A still further object of the invention is to provide a new method of obtaining electrical energy from solar energy wherein solutions of isomerizable chemical compounds are placed in chambers separated by an ion bridge and one of the chambers is irradiated while the other is shielded, causing isomerization in the irradiated side and resulting in a potential difference between the chambers.

Another object of the invention is to provide new means for obtaining and storing electrical energy from solar energy by photochemical and electrochemical means.

A further object of the invention is to provide a new fuel cell for the photochemical conversion of solar energy to electrical energy and storage of same.

A still further object of the invention is to provide a fuel cell for the conversion of solar energy to electrical energy whereby isomerizable organic chemical compounds are placed in chambers separated by ion bridge and means are provided to alternately irradiate and shield the chambers.

A still further object of the invention is to provide apparatus for the photochemical conversion of solar energy to electrical energy in which the apparatus and chemical reactions occurring therein are reversible.

A still further object of the invention is to provide a new cell for the conversion of solar energy to electrical energy in which the cell is not reversible.

Various other objects, advantages and features of the invention will become apparent from the following description taken in connection with the accompanying drawings, in which.

Figure 1:
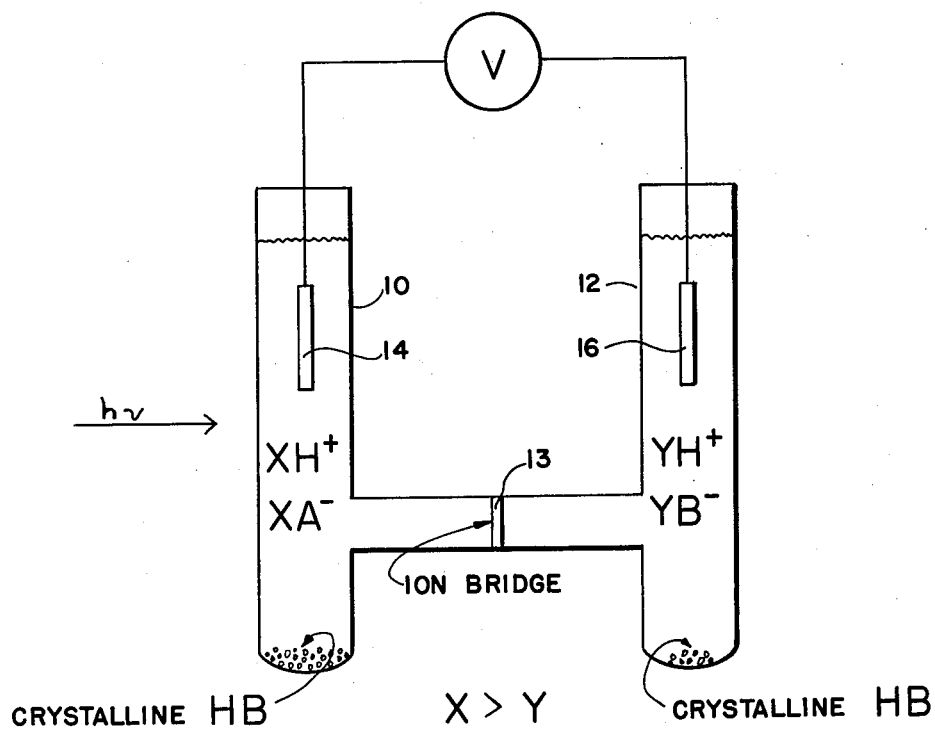
FIG. 1 is a diagrammatic view illustrating the construction and operation of the fuel cell and method of the invention.

The following is a discussion and description of preferred specific embodiments of the new method and means of providing electrical energy from solar energy, such being made with reference to the drawings whereon the same reference numerals are used to indicate the same or similar parts and/or structure. It is to be understood that such discussion and description is not to unduly limit the scope of the invention.

Photochemical reactions are known to the art. Only a relatively small number of these are energy storing reactions, the majority being reactions wherein the radiant energy merely acts as a catalyst to provide the activation energy to promote a reaction already thermodynamically favored. The energy storing photochemical reactions are the type employed in practicing our invention, particularly those in which isomerization results from irradiation.

In our invention radiation, particularly ultraviolet radiation, causes the geometrical isomers preferably used in the practice of our invention to change from one molecular configuration to another, that is normally from the trans-form to the cis-form. After converting solar irradiation energy to chemical energy by irradiation of the chemical compound, it is then converted in an electrochemical manner, to result in a practical and usable form of energy.

In practicing our invention two solutions containing the same ion at different concentrations are connected by an ion bridge. The solutions have a potential difference therebetween as a result of the ion concentration difference. Such a cell we call the concentration cell, and the potential thereof is given by the equation:

$$E = \frac{RT}{nF} \ln \frac{A_1}{A_2}$$

Where E is the potential difference, R is the gas constant, T the temperature (degrees K.), F the Faraday constant, $n$ the number of electrons taking part in the electrode reactions and $A_1$ and $A_2$ represent the activity (approximately the concentration) of ions in the two portions of the cell. In the practice of our invention we prefer to use organic acids or inorganic bases.

For teaching those skilled in the art, and as an example, the relatively weak acids preferably used in our invention dissociate in the following manner:

$$HA \rightleftharpoons H^+ + A^-$$

and the dissociation constant is defined as:

$$K = \frac{(H^+)(A^-)}{(HA)}$$

where the parentheses represent the activities or concentrations of the various species present in solution. In pure acid solutions the concentration of the hydrogen ions equals the concentration of the anion, and for a pure cis acid the concentration of hydrogen ions is given by:

$$(H^+)_c = (K_c(HA)_c)^{\frac{1}{2}}$$

$(HA)_c$ is approximately equal to the molality of the solution. A corresponding expression can be obtained for the trans-acid.

The concentration cell of our invention composed of a cis acid in one side or chamber and a trans-acid in the other side or chamber has a potential given by combining the first and last equations given above as follows:

$$E = \frac{2.3RT}{nF} \log \left( \frac{K_c(HA)_c}{K_t(HA)_t} \right)^{1/2}$$

The cis-isomer has been found to be more soluble than the trans-isomer and possess a higher dissociation constant. Both the cis and trans acids ionize in the water employed in our concentration cell to give hydrogen ions. However, we have found it to be that there are more hydrogen ions in the saturated cis acid solution than in the corresponding trans acid solution. A potential difference then has been found to exist between saturated cis acid and trans acid solutions in the two chambers or portions of the concentration cell of our invention which are connected by the ion bridge.

FIG. 1 of the drawings diagrammatically illustrates a preferred specific embodiment of the concentration cell of our invention composed of two sections or chambers 10 and 12 separated by an ion bridge. Electrodes 14 and 16 are provided for each cell. Initially, both of the chambers 10 and 12 are filled with saturated solutions of the trans acid and a large excess of the solid trans acid, indicated as HB, is placed in the chamber 10. Both chambers then contain hydrogen ions (H+) and anions indicated as (B−). The side or chamber indicated at 10 is then exposed to incident radiation while side or chamber 12 is shielded. The irradiated trans acid in chamber 10 is changed photochemically into the cis form having the A− anion. As this radiation occurs and continues more and more of the solid trans acid HB goes into solution and is photochemically changed into the cis form.

The dissociation constants and solubilities of the cis and trans form are different, and there are more hydrogen ions in the saturated cis-acid solution than in the corresponding trans-acid solution. Thus, using X and Y to represent the quantities of ions in the cis and trans acids in solution, X is always greater than Y. This establishes a potential difference between the chambers 10 and 12 of the cell. We have found that the isomerization occurs upon radiation regardless of whether or not current is being drawn from the cell through the electrodes 14 and 16, thereby providing self-contained storage of available power that can be used during periods when no irradiation occurs.

In operation, electrons are transferred through the conductor between the electrodes 14 and 16 when such are connected to draw current from the cell. During such, hydrogen ions from the high concentration side or cis side 10 are transferred to the lower concentration side 12. The solution is momentarily unbalanced electrically and, to restore electrical neutrality in the solution, an anion in the cis-configuration is passed through the ion bridge 13 from side 10 to side 12.

To maintain unbalance and electrical potential, the cis-configuration anion is changed to the trans-configuration anion. The cis form has been found to be thermodynamically unstable in the cell of our invention, and catalysts can be provided to promote the cis to trans isomerization. Chamber 12 preferably contains such a catalyst, and the net cell reaction is to take cis acid from side 10 and deposit it as solid trans acid shown as HB in side 12.

Organic acids preferably used in the practice of our invention include compounds of the following type, which are given by way of illustration and not limitation:

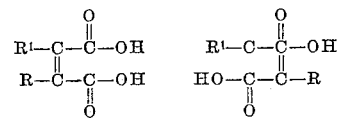

Where R and $R^1$ preferably can be all permutations and combinations of alkyl, aryl, halogens, hydroxy, nitro, amino, hydrogen, and the like. These include fumaric-maleic acids, mesaconic-citraconic acids (methyl fumaric and maleic acids), ethyl fumaric-maleic acids, and on up the homologous series, i.e., propyl, butyl, etc.; dimethyl fumaric-maleic acid, diethyl fumaric-maleic acid, etc., on up the homologous series; methyl, ethyl fumaric-maleic acid, methyl, propyl fumaric-maleic acid, etc., on up the series; chloro, fumaric-maleic acids, bromo, fumaric-maleic acids, iodo, fumaric-maleic acids, hydroxy, fumaric-maleic acids, nitro, fumaric-maleic acids, amino, fumaric-maleic acids, dichloro, fumaric-maleic acids, dibromo, fumaric-maleic acids, diiodo, fumaric-maleic acids, dihydroxy, fumaric-maleic acids, alkyl, chloro fumaric-maleic acids, alkyl, bromo fumaric-maleic acids, alkyl iodo fumaric-maleic acids, alkyl, hydroxy fumaric-maleic acids, alkyl, nitro fumaric-maleic acids, alkyl, amino fumaric-maleic acids, aryl chloro fumaric-maleic acids, aryl bromo fumaric-maleic acids, aryl iodo fumaric-maleic acids, aryl hydroxy fumaric-maleic acids, aryl nitro fumaric-maleic acids, aryl amino fumaric-maleic acids, phenyl fumaric-maleic acids, napthyl fumaric-maleic acids, o-chloro phenyl fumaric-maleic acids, m-chloro phenyl fumaric-maleic acids, p-chloro phenyl fumaric-maleic acids, o-dichloro phenyl fumaric-maleic acids, o,m-dichloro phenyl fumaric-maleic acids, o,p-dichloro phenyl fumaric-maleic acids, m,p-dichloro phenyl fumaric-maleic acids, etc., with other substitution on the phenyl group, α,β diphenyl fumaric-maleic acids, α phenyl, β alkyl fumaric-maleic acids, α phenyl, β napthyl fumaric-maleic acids, α napthyl, β alkyl fumaric-maleic acids, vinyl fumaric-maleic acids, divinyl fumaric-maleic acids, alkyl fumaric-maleic acids, dialkyl fumaric-maleic acids, etc., of unsaturated systems, and the like.

Also preferred and usable are compounds of the following types, which are again given by way of illustration and not limitation.

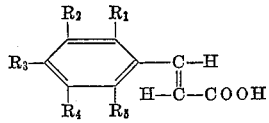

Where $R_1$ through $R_5$ preferably can be all permutations and combinations of alkyl, aryl, halogens, hydroxy, nitro, amino, hydrogen and the like. These include cinnamic acids cis and trans, o-chloro cinnamic acids cis and trans, p-chloro cinnamic acids cis and trans, m-chloro cinnamic acids cis and trans, o-bromo cinnamic acids cis and trans, p-bromo cinnamic acids cis and trans, m-bromo cinnamic acids cis and trans, o-iodo cinnamic acids cis and trans, p-iodo cinnamic acids cis and trans, m-iodo cinnamic acids cis and trans, o-hydroxy cinnamic acids cis and trans, p-hydroxy cinnamic acids cis and trans, m-hydroxy cinnamic acids cis and trans, o-nitro cinnamic acids cis and trans, p-nitro cinnamic acids cis and trans, m-nitro cinnamic acids cis and trans, o-amino cinnamic acids cis and trans, p-amino cinnamic acids cis and trans, m-amino cinnamic acids cis and trans, o-methyl cinnamic acids cis and trans, p-methyl cinnamic acids cis and trans, m-methyl cinnamic acids cis and trans, o-other alkyl cinnamic acids cis and trans, p-other alkyl cinnamic acids cis and trans, m-other alkyl cinnamic acids cis and trans, o-aryl cinnamic acids cis and trans, p-aryl cinnamic acids cis and trans, m-aryl cinnamic acids cis and trans, 1,2, dichloro cinnamic acids cis and trans, 1,3, dichloro cinnamic acid, 1,4, dichloro cinnamic acid, 1,5, dichloro cinnamic acid, 2,3, dichloro cinnamic acid, 2,4, dichloro cinnamic acid, 2,5, dichloro cinnamic acid, etc. with other substitution cinnamic acid, 2,3,4, tri chloro cinnamic acid, 4,5,6, tri chloro cinnamic acid, 2,4,6, tri chloro cinnamic acid, 2,4,5, tri chloro cinnamic acid, 2,5,6, tri chloro cinnamic acid, 3,4,5, tri chloro cinnamic acid, 3,5,6, tri chloro cinnamic acid, etc., with other substitution cinnamic acid, o-chloro, p-bromo cinnamic acid, o-chloro, m-bromo cinnamic acid, m-chloro, p-bromo cinnamic acid, o-bromo, p-chloro cinnamic acid, o-bromo, m-chloro cinnamic acid, m-bromo, p-chloro cinnamic acid, etc., with other substitution, and the like.

Compounds of the following type are also usable and preferred, but those listed are not to unduly limit the scope of our invention.

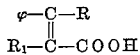

Where R and $R_1$ can be all permutations and combinations of alkyl, aryl, halogens, hydroxy, nitro, amino, hydrogen and the like. These include α methyl cinnamic acid, α alkyl (general) cinnamic acid, α aryl (general) cinnamic acid, α halogen cinnamic acid, α hydroxy cinnamic acid, α amino cinnamic acid, α nitro cinnamic acid, β alkyl cinnamic acid, β aryl cinnamic acid, β halogen cinnamic acid, β hydroxy cinnamic acid, β nitro cinnamic acid, β amino cinnamic acid, various α,β combination cinnamic acid, various, α,β combinations for substituted cinnamic acids, elaidicoleic acids, various retinene deratives (vitamin A) and the like.

The compounds and groups enumerated above and preferred in the practice of our invention are of the type

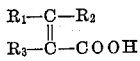

Where each $R_1$, $R_2$ and $R_3$ is selected from COOH, hydrogen, aryl, alkyl, halogen, hydroxy, nitro and amino, with the exception of the last two specific compounds.

The oleic acid and vitamin A are only preferred ones of the many compounds of the general type:

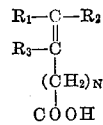

Where $R_1$, $R_2$ and $R_3$ are selected from COOH, hydrogen, aryl, alkyl, halogen, hydroxy, nitro and amino. These acids are enumerated as illustrative of those which are suitable for use with the system of our invention, and the above enumeration is not intended to be an exclusive or limiting list of suitable acids.

Various bases which change ionization upon irradiation can also be used in setting up the concentration cell in the practice of our invention. These cells involve the metal ions in place of the hydrogen ions. This has been found possible, since in some solvent, cis-trans acid systems various bases are sparingly soluble in the trans-acid solution, but a great deal more soluble in the cis-acid system. The bases are utilized with saturated trans and cis acids, resulting in an excess of the metal ions being present in the cis acid and a potential difference is obtained. Illustrative examples of bases suitable for this type of system in the practice of our invention are as follows: titanium hydroxide, vanadium hydroxide, chromous hydroxide, chromic hydroxide, manganous hydroxide, ferric hydroxide, ferrous hydroxide, cobaltous hydroxide, cobaltic hydroxide, nickel hydroxide, cupric hydroxide, cuprous hydroxide, zirconium hydroxide, niobium hydroxide, molybdenum hydroxide, silver hydroxide, stannous hydroxide, stannic hydroxide, tungsten hydroxide, lead hydroxide, bismuth hydroxide, thorium hydroxide, uranous hydroxide, uranic hydroxide, tantalum hydroxide, and the like. This list of bases is merely illustrative of those suitable for use and is not intended to be an all inclusive listing. The electrodes used in these systems are the solid metal of the ion in solution.

Various solvents can be used with the acid and base systems listed hereinbefore, such including: water, liquid ammonia, alcohols (methyl, ethyl, isopropyl for example), amines (methylamine, dimethylamine, trimethylamine for example), dimethyl formamide, dimethyl sulfoxide, carboxylic acids (acetic acid for example) sulfuric acid, dioxane, acetone, methyl, ethyl ketone, liquid HCN, pyridine, liquid hydrogen sulfide, ethylene glycol, glycerin, hydrogen peroxide, nitrobenzene, nitromethane, and used salts (potassium nitrate, sodium nitrate, lithium nitrate eutectic, for example).

Figure 2:
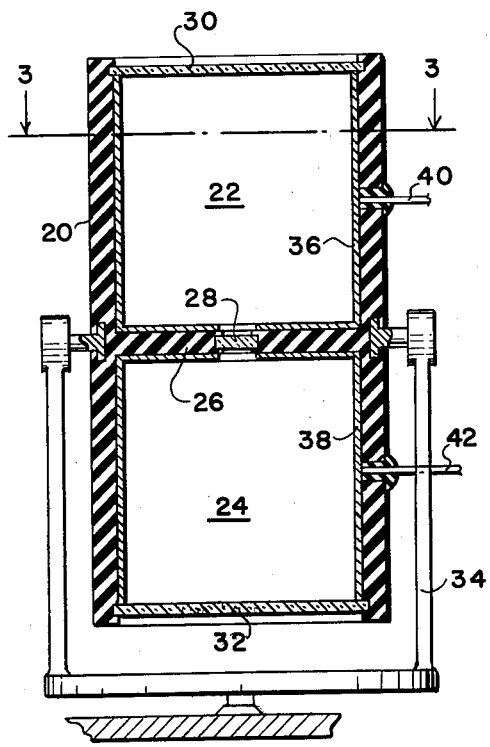
FIG. 2 is a cross section view through a fuel cell constructed in accordance with the invention.
Figure 3:
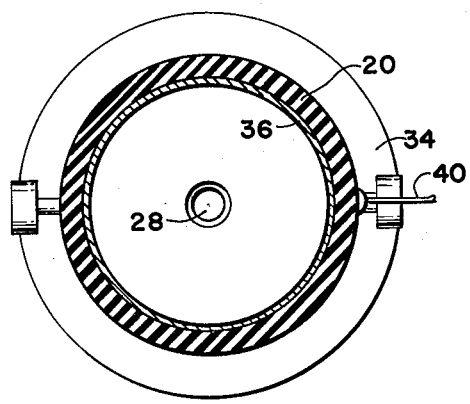
FIG. 3 is a transverse cross section view taken along the line 3—3 of the cell shown in FIG. 2.

The drawings illustrate preferred constructions of the concentration cell in accordance with the invention. In FIGS. 2 and 3 of the drawings, a cell is shown which consists of a generally tubular housing 20 which is preferably formed of an insulating material, such as rubber, synthetic rubber, suitable plastics, glass or the like. Housing 20 is divided into chambers or sections 22 and 24 by a wall 26 which can be either integrally formed or separately secured to the tubular member 20. Wall 26 has an ion bridge 28 therein connecting the chambers 22 and 24. The ion bridge can be a porous disc, a salt bridge, an agar-agar salt bridge, an anion permeable membrane, pure diffusion (no separation), or other types of bridges known to the art. The bridge illustrated is of a sintered glass construction.

Opposite ends of the tubular member 20 are closed by glass discs or windows 30 and 32 or other suitable material which will admit the radiation. One of the discs is directed toward the radiating source while the other is shielded therefrom so that only one chamber 22 or 24 is irradiated at any one time. Various means can be provided for directing the chamber to be irradiated at the radiating source, such being shown in FIG. 2 as a common azimuth mount 34. This type of mount permits horizontal and vertical adjustment of the cell and also permits the cell to be rotated so that the chambers can be alternately irradiated.

Electrodes are provided for each of the chambers 22 and 24, and in this instance they are shown at 36 and 38 respectively. The electrodes 36 and 38 are shown as covering the entire inner surface of the chambers 22 and 24 with the exception of the opening for the ion bridge 28 and the ends which are closed by the glass discs 30 and 32. Various types of electrodes are usable with the concentration cell of the invention, such including hydrogen bubble electrodes, quinhydrone electrodes, glass electrodes, and metal electrodes. The metal electrodes are used in systems containing metal ions, the electrode being the solid metal of the ion in solution.

Figure 6:
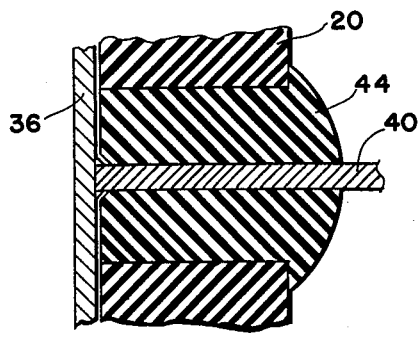
FIG. 6 is an enlarged cross section view showing a preferred manner of connecting the conductor to the electrode.

Conductors 40 and 42 are secured to the electrodes 36 and 38 respectively in any suitable manner. FIG. 6 shows one suitable manner of doing this. The conductor 40 is received by a plug 44 formed of rubber or ther non-conducting material and the inner end of the conductor 40 is fused or otherwise suitably secured to the electrode 36. Plug 44 is received by an opening in tubular member 20 and firmly secured therein.

The cell, constructed as shown in FIGS. 2 and 3, is filled with saturated solutions of the type enumerated herein above. In acid systems, the chambers 22 and 24 both receive the trans form of the acid. An excess of the trans acid in the solid form is placed in the chamber 22 and a catalyst of the type to promote the cis to trans isomerization is placed in chamber 24. Preferred catalysts of this type include sulfur, bromine, sulfuric acid, metal sulfides, palladium, various organic enzymes, various bacteria, heat, hydrobromic acid, iodine, and the like. Chamber 22 is then directed toward the source of radiation by manipulating tubular member 20 within the azimuth mount 34 while chamber 24 is shielded from irradiation in any suitable means. The photochemical and electrochemical reactions described hereinbefore in connection with FIG. 1 will then occur in the chambers 22 and 24, resulting in a potential difference between the electrodes 36 and 38. The electrical energy thus provided can be utilized as produced, or it can be stored by the concentration cell until needed, including periods when no irradiation of the chamber 22 can be provided.

When all of the solid trans acid has been exhausted in chamber 22 and the trans acid in solution isomerized by irradiation, the tubular member 20 can be reversed so that the chamber 24 can be irradiated while chamber 22 is shielded, thus reversing the chemical reaction taking place and producing additional electrical energy.

Figure 4:
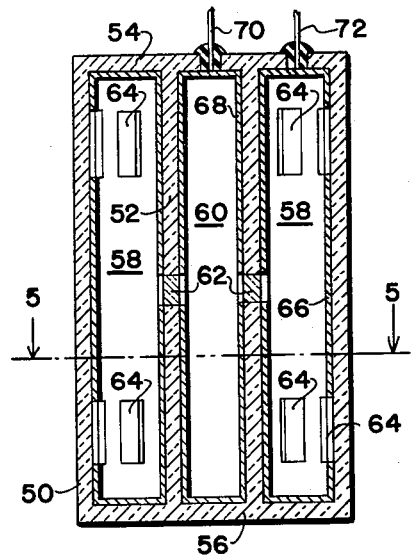
FIG. 4 is a cross section view showing a so-called dry cell or non-reversible cell constructed in accordance with the invention.
Figure 5:
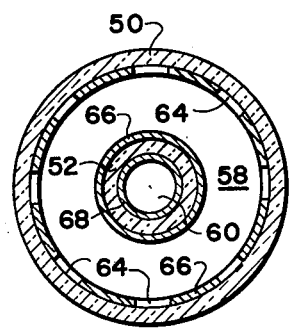
FIG. 5 is a cross section view taken along the line 5—5 of the cell shown in FIG. 4.

Non-reversible cells or so-called dry cells can also be produced by the method of the invention. An example of this type construction is shown in FIGS. 4 and 5 of the drawings. In this instance, a housing 50, which is shown as cylindrical, is provided with a concentric wall 52 which can be integrally formed with the housing. The housing 50 and wall 52 are preferably formed of non-conducting materials, such as glass as shown in the drawings, or rubber, plastics or other insulating materials. The ends 54 and 56 of the container can also be integrally formed or separately formed as desired. The inner wall 52 separates the cell 50 into concentric chambers, 58 and 60. The chambers are connected by one or more ion bridges 62. A plurality of windows 64 in housing 50 permit radiation to pass through the outer wall of the cell into the outer chamber 58. Electrodes 66 and 68 are provided in the chambers 58 and 60 respectively and preferably cover the entire inner surface of the chambers with the exception of openings for the windows 64 and for the ion bridge 62. Conductors 70 and 72 are insulated from the housing and connected to the electrodes in a manner similar to that shown in FIG. 6.

The chambers 58 and 60 are filled with saturated solutions of the acids or bases hereinbefore mentioned and the solution in the chamber 58 is irradiated through windows 64, resulting in the isomerization of the solution and the resulting potential difference between the chambers as hereinbefore described. Chamber 60 preferably includes a catalyst of the type described to promote the reverse isomerization. This cell is non-reversible since the inner chamber 60 cannot be irradiated, and the cell is used up or dead when isomerization is completed in chamber 58 and the stored electrical energy used.

The following examples and the materials, concentration, voltages, etc. set forth therein are given by way of illustration and are not intended to limit the scope of the invention.

EXAMPLE I

A concentration cell was constructed similar to that shown in FIG. 1 having two separate chambers separated by a sintered glass ion bridge. The two chambers were filled with various concentrations of maleic and fumaric acids. Gold quinhydrone electrodes were placed in each chamber and each solution used in the tests was saturated with quinhydrone. The solutions were stirred with nitrogen gas and the voltage or potential between the chambers was measured. Table I hereof sets forth the conditions and results of the five (5) tests, two (2) without and three (3) with KCl added to the chambers in the concentration indicated.

EXAMPLE II

A concentration cell was constructed similar to that shown in FIG. 1 having two separate chambers separated by a sintered glass ion bridge. The two chambers were filled with various concentrations of citraconic and mesaconic acids. Gold quinhydrone electrodes were placed in each chamber and each solution was saturated with quinhydrone. The solutions were stirred with nitrogen gas and the resulting potential was measured. Conditions and results of the four (4) tests are set forth in Table I hereof.

*Table I*

E.M.F. OF CIS-TRANS CONCENTRATION CELLS

| System | Concentration of cis-acid, m. | Concentration of trans-acid, m. | Concentration of KCl | Theoretical E.M.F. (volts) | Experimental E.M.F. (volts) |
| --- | --- | --- | --- | --- | --- |
| Maleic-Fumaric Acid. | 0.060 | 0.060 | | .033 | .006 |
| Do | 0.060 | 0.060 | 1 N | .033 | .035 |
| Do | 0.060 | 0.060 | 2 N | .033 | .035 |
| Do | 6.72 | 0.060 | | .095 | .010 |
| Do | 6.72 | 0.060 | 1 N | .095 | .111 |
| Citraconic-Mesaconic Acid. | 0.21 | 0.21 | | .019 | .002 |
| Do | 0.21 | 0.21 | 1 N | .019 | .024 |
| Do | 27.7 | 0.21 | | .083 | .008 |
| Do | 27.7 | 0.21 | 1 N | .083 | .100 |

EXAMPLE III

A concentration cell was constructed similar to that shown in FIG. 1 having two separate chambers separated by sintered glass ion bridge. The two chambers were filled with dihydroxy fumaric and dihydroxy maleic acids. Gold quinhydrone electrodes were placed in each chamber and each solution was saturated with quinhydrone. The solutions were stirred with nitrogen gas and a constant potential was obtained.

EXAMPLE IV

A concentration cell was constructed similar to that shown in FIG. 1 having two separate chambers separated by a sintered glass ion bridge. The two chambers were filled with concentrations of cis and trans cinnamic acids. Gold quinhydrone electrodes were placed in each chamber and each solution was saturated with quinhydrone. The solutions were stirred with nitrogen gas and a constant potential was obtained.

The construction of the concentration cells as set forth is merely illustrative of various constructions which can be utilized without departing from the spirit of this invention. For example, cells having adjacent chambers in a side by side relation can be constructed having mechanical means for alternately exposing one of the chambers to irradiation while shielding the other. Also, various mounting means can be provided so that the cell being irradiated will be continuously pointed in the direction of the radiating source, such as by gyroscopic mountings on other inertial type systems. Various other changes or departures from the constructions and steps hereinbefore set forth can be made by those skilled in the art without departing from the spirit or the scope of this disclosure.

We claim:

1. A fuel cell for the photochemical conversion of solar energy to electrical energy and storage of same comprising, in combination, two chambers containing saturated solutions of fumaric acid in water, said chambers being separated by a sintered glass ion bridge, said solution in one of said chambers being exposable to sunlight and said solution in the other of said chambers being shielded from sunlight, said one of said chambers containing an excess of said fumaric acid in the solid form, each of said chambers having a hydrogen electrode therein, said fuel cell being constructed and adapted so that when said solution in said one chamber of said cell is irradiated by sunlight said fumaric acid therein will undergo a photochemical isomerization of said fumaric acid to maleic acid, causing the passing into solution of at least part of said fumaric acid in the solid form and the transfer of an anion through said ion bridge to said other chamber, resulting in an electrical potential between said electrodes.

2. A fuel cell for the photochemical conversion of solar energy to electrical energy and storage of same comprising, in combination, two chambers containing saturated solutions of a photochemical geometrical isomerizable chemical compound of the same molecular configuration, said chambers being separated by an ion bridge, said solution of one of said chambers being exposable to sunlight and said solution of the other of said chambers being shielded from sunlight, said one of said chambers containing an excess of said chemical compound in the solid form, each of said chambers having an electrode therein, said fuel cell being constructed and adapted so that when said solution of said one chamber of said cell is irradiated by sunlight said solution therein will undergo a photochemical isomerization resulting in the passing into solution of at least part of said isomer in the solid form and the transfer of an anion from said one chamber to said other chamber, thereby creating an electrical potential between said electrodes.

3. A fuel cell for the photochemical conversion of solar energy to electrical energy and storage of same, comprising, in combination, two chambers containing solutions of a photochemical geometrical isomerizable chemical compound in the same molecular configuration, said chambers being separated by an ion bridge, each of said chambers having an electrode therein, said solution in one of said chambers being exposable to radiation and said solution in the other of said chambers being shielded from radiation, said cell being constructed so that when said solution in said one chamber is irradiated said solution therein will undergo a photochemical isomerization resulting in the transfer of an anion from said one chamber to said other chamber and the creation of an electrical potential between said electrodes.

4. The device as recited in claim 3 wherein said chambers are concentric, said one of said chambers surrounding said other of said chambers, and said chambers being separated by an insulating material.

5. The device as recited in claim 3 wherein said chambers are in opposite ends of a tubular housing, said chambers being separated by an insulating wall.

6. The method of obtaining electrical energy from solar energy and storing same by a photochemical reaction comprising the steps of, filling two chambers with saturated solutions of fumaric acid in water, placing an excess of fumaric acid in the solid form in one of said chambers, connecting said chambers with a sintered glass ion bridge, providing electrodes to each of said chambers, and exposing said solution of said one of said chambers to sunlight and irradiating said fumaric acid therein while shielding said solution of the other chamber from sunlight, thereby isomerizing said fumeric acid in said one chamber to maleic acid and causing the passing into solution of at least part of said fumaric acid in the solid form and transferring an anion through said bridge to said other chamber, establishing an electrical potential between said chambers.

7. The method of obtaining electrical energy from solar energy by a photochemical reaction comprising the steps of, filling two chambers with saturated solutions of a geometrical isomerizable chemical compound of the same molecular configuration, connecting said chambers with an ion bridge, providing electrodes to each of said chambers, and exposing said solution of one of said chambers to irradiation while shielding said solution of the other of said chambers from irradiation, thereby isomerizing said solution in said one of said chambers and transferring an anion through said bridge to said other chamber and establishing an electrical potential between said chambers.

8. The method as recited in claim 7 wherein said chemical compound has the structural formula

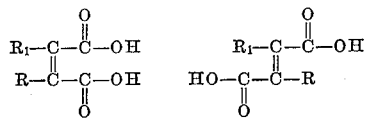

where each R and $R_1$ are radicals selected from the group consisting of alkyl, aryl, halogens, hydroxy, nitro, amino, and hydrogen.

9. The method as recited in claim 7 wherein said chemical compound has the structural formula

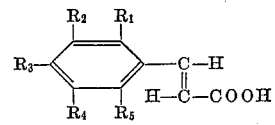

where each $R$–$R_5$ are radicals selected from the group consisting of alkyl, aryl, halogens, hydroxy, nitro, amino, and hydrogen.

10. The method as recited in claim 7 wherein said chemical compound has the structural formula

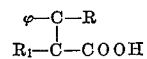

where each R and $R_1$ are radicals selected from the group consisting of alkyl, aryl, halogens, hydroxy, nitro, amino, and hydrogen.

11. The method as recited in claim 7 wherein the chemical compound has the structural formula

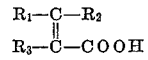

where each $R_1$, $R_2$ and $R_3$ are radicals selected from the group consisting of COOH, hydrogen, aryl, alkyl, halogen, hydroxy, nitro and amino.

12. The method as recited in claim 7 wherein the chemical compound has the structural formula

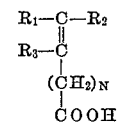

where $R_1$, $R_2$ and $R_3$ are all selected from COOH, hydrogen, aryl, alkyl, halogen, hydroxy, nitro and amino.

13. The method as recited in claim 7 wherein said chemical compound contains metal ions.

14. The method of converting photochemical irradiation energy into chemical energy, comprising the steps of, placing solutions of photochemical geometrical isomerizable chemical compounds in two chambers which are separated by an ion bridge, providing electrodes to each of said chambers, and exposing the solution in one of said chambers to photochemical irradiation while shielding the solution in the other of said chambers from irradiation.

15. The method of converting solar energy to chemical energy and storing same comprising the steps of, placing saturated solutions of a photochemical geometrical isomerizable chemical compound of the same molecular configuration in two chambers which are separated by an ion bridge, placing an excess of said chemical compound in the solid form in one of said chambers, providing electrodes to each of said chambers, and exposing said solution of one of said chambers to sunlight while shielding said solution of said other of said chambers from sunlight.

References Cited in the file of this patent

Heidt et al.: Science, vol. 117, Jan. 23, 1953, pages 75–76.

Heidt: Proc. Am. Academy Arts and Sciences, vol. 79, 1951, pages 228–233.